United States Patent
Liu et al.

(10) Patent No.: US 12,414,020 B2
(45) Date of Patent: Sep. 9, 2025

(54) HANDOVER METHOD AND APPARATUS, TERMINAL DEVICE, AND NETWORK DEVICE

(71) Applicant: VIVO MOBILE COMMUNICATION CO., LTD., Dongguan (CN)

(72) Inventors: Jiamin Liu, Dongguan (CN); Yang Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 395 days.

(21) Appl. No.: 17/981,927

(22) Filed: Nov. 7, 2022

(65) Prior Publication Data

US 2023/0067429 A1    Mar. 2, 2023

Related U.S. Application Data

(63) Continuation of application No. PCT/CN2021/092723, filed on May 10, 2021.

(30) Foreign Application Priority Data

May 13, 2020   (CN) .................. 202010403977.3

(51) Int. Cl.
   *H04W 88/04*   (2009.01)
   *H04W 36/00*   (2009.01)
   *H04W 36/08*   (2009.01)
(52) U.S. Cl.
   CPC .... *H04W 36/0085* (2018.08); *H04W 36/0011* (2013.01); *H04W 36/08* (2013.01)
(58) Field of Classification Search
   CPC . H04W 88/04; H04W 36/0085; H04W 36/08; H04W 92/18
   See application file for complete search history.

(56) References Cited

U.S. PATENT DOCUMENTS

| 2019/0357196 A1* | 11/2019 | Majmundar | ........ H04L 49/3072 |
| 2021/0045093 A1* | 2/2021 | Rao | ........ H04W 76/14 |

(Continued)

FOREIGN PATENT DOCUMENTS

| CN | 101998554 A | 3/2011 |
| CN | 109151928 A | 1/2019 |

(Continued)

OTHER PUBLICATIONS

3GPP TSG-RAN WG3 Meeting #96, R3-171655, ZTE, "TP for Relay to Relay Path Switch in feD2D," Hangzhou, China, May 15-19, 2017.

(Continued)

*Primary Examiner* — Barry W Taylor
(74) *Attorney, Agent, or Firm* — Stites & Harbison, PLLC; Jeffrey A. Haeberlin

(57) ABSTRACT

This application discloses a handover method and apparatus, a terminal device, and a network device. The handover method includes: receiving a first message sent by a source cell, where the first message is used to instruct a relay terminal to hand over to a target cell, the first message carries target configuration information of the target cell, and the target configuration information includes first configuration information of the relay terminal and second configuration information of data of a remote terminal on a Uu interface, where the remote terminal is a remote terminal of the relay terminal; and accessing the target cell according to the target configuration information.

18 Claims, 5 Drawing Sheets

(56) References Cited

U.S. PATENT DOCUMENTS

2022/0116841 A1\* 4/2022 Tenny ............... H04W 36/0009
2024/0357451 A1\* 10/2024 Pan ................... H04W 36/0016

FOREIGN PATENT DOCUMENTS

| CN | 109328483 | A | 2/2019 |
| CN | 110720238 | A | 1/2020 |
| CN | 111132244 | A | 5/2020 |
| CN | 109661836 | B | 5/2021 |
| EP | 3282755 | A1 | 2/2018 |
| WO | 2011/000161 | A1 | 1/2011 |
| WO | 2014/014323 | A1 | 1/2014 |

OTHER PUBLICATIONS

3GPP TSG-RAN2 Meeting #98, R2-1704995, OPPO, "Discussion on group mobility procedure," Hangzhou, China, May 15-19, 2017.

3GPP TSG-RAN WG2 #112e. Electronic meeting Nov. 2-13, 2020. R2-2009721. Ericsson. Service continuity procedure and scenarios for sidelink relay.

3GPP TSG RAN WG2 Meeting #113e. e-Meeting Jan. 25-Feb. 5, 2020. R2-2101300. Intel Corporation. Inter-gNB Path Switching for L2 U2N Relay.

China National Intellectual Property Administration, International Search Report issued in corresponding Application No. PCT/CN2021/092723, mailed Jul. 14, 2021.

\* cited by examiner

100

S110: Receive a first message sent by a source cell, where the first message is used to instruct a relay terminal to hand over to a target cell S112: Access the target cell according to target configuration information

S210: Send a first message to a relay terminal, where the first message is used to instruct the relay terminal to hand over to a target cell, and the first message carries target configuration information in the target cell

S310: Obtain fifth configuration information of a remote terminal in a target cell S312: Reconfigure a sidelink interface over a relay terminal according to the fifth configuration information

FIG. 3

HANDOVER METHOD AND APPARATUS, TERMINAL DEVICE, AND NETWORK DEVICE

CROSS-REFERENCE TO RELATED APPLICATIONS

This application is a continuation of International Application No. PCT/CN2021/092723, filed on May 10, 2021, which claims priority to Chinese Patent Application No. 202010403977.3, filed on May 13, 2020 in China, which is incorporated herein by reference in its entirety.

TECHNICAL FIELD

The present disclosure relates to the communications field, and in particular, to a handover method and apparatus, a terminal device, and a network device.

BACKGROUND

In a Long Term Evolution (Long Term Evolution, LTE) system, a sidelink (sidelink, side link, or edge link) is used to perform direct data transmission between terminal devices (User Equipment, UE) without a network device.

The LTE sidelink is applicable to specific public safety matters (such as emergency communication at a fire place or a disaster place such as an earthquake) or vehicle to everything (vehicle to everything, V2X) communication. Internet of vehicles communication includes various services, such as basic security type communication, advanced (automatic) driving, formation, and sensor extension. The LTE sidelink only supports broadcast communication, and therefore is mainly used for basic security communication. Other advanced V2X services with a strict QoS requirement in terms of latency and reliability are supported by an NR sidelink.

A 5G new radio (NR) system can be used in an operating frequency band greater than 6 GHz that is not supported by LTE, and supports a larger operating bandwidth. However, the NR system in a current release only supports an interface between a base station and a terminal, and does not support a sidelink interface for direct communication between terminals. The sidelink interface may also be referred to as a PC5 interface.

At present, sidelink transmission is mainly divided into broadcast (broadcast), groupcast (groupcast), and unicast (unicast) transmission forms. Unicast is one to one transmission. Currently, sidelink unicast and multicast communication support a HARQ feedback mechanism at a physical layer.

In the related art, resource allocation modes of sidelink UE are classified into two types:
(1) Base station scheduling mode (Mode 1): A network side device (base station) is responsible for allocating resources to each UE.
(2) UE autonomous mode (Mode 2): Each UE selects resources independently.

In a typical sidelink relay scenario, remote UE forwards data to a base station over a sidelink between the remote UE and relay (relay) UE. In this scenario, data transmission is performed between the remote UE and the base station, and the relay UE serves as a data forwarding function.

In the related art, a technical solution on how to hand over UE in a relay scenario is not provided, resulting in service interruption of the remote UE and compromising user experience.

SUMMARY

According to a first aspect of the present disclosure, a handover method is provided, applied to a relay terminal. The method includes: receiving a first message sent by a source cell, where the first message is used to instruct the relay terminal to hand over to a target cell, the first message carries target configuration information in the target cell, and the target configuration information includes first configuration information of the relay terminal and second configuration information of data of a remote terminal on a Uu interface, where the remote terminal is a remote terminal of the relay terminal; and accessing the target cell according to the target configuration information.

According to a second aspect of the present disclosure, a handover method is provided, applied to a network device. The method includes: sending a first message to a relay terminal, where the first message is used to instruct the relay terminal to hand over to a target cell, the first message carries target configuration information in the target cell, and the target configuration information includes first configuration information of the relay terminal and second configuration information of data of a remote terminal on a Uu interface, where the remote terminal is a remote terminal of the relay terminal.

According to a third aspect of the present disclosure, a handover method is provided, applied to a remote terminal. The method includes: obtaining fifth configuration information of the remote terminal in a target cell; and reconfiguring a sidelink interface over a relay terminal according to the fifth configuration information.

According to a fourth aspect of the present disclosure, a handover apparatus is provided, including: a first receiving module, configured to receive a first message sent by a source cell, where the first message is used to instruct a relay terminal to hand over to a target cell, the first message carries target configuration information of the target cell, and the target configuration information includes first configuration information of the relay terminal and second configuration information of data of a remote terminal on a Uu interface, where the remote terminal is a remote terminal of the relay terminal; and a handover module, configured to access the target cell according to the target configuration information.

According to a fifth aspect of the present disclosure, a handover apparatus is provided, including: a fourth sending module, configured to send a first message to a relay terminal, where the first message is used to instruct the relay terminal to hand over to a target cell, the first message carries target configuration information of the relay terminal in the target cell, and the target configuration information includes first configuration information of the relay terminal and second configuration information of data of a remote terminal on a Uu interface, where the remote terminal is a remote terminal of the relay terminal.

According to a sixth aspect of the present disclosure, a handover apparatus is provided, including: an obtaining module, configured to obtain fifth configuration information of a remote terminal in a target cell; and a reconfiguration module, configured to reconfigure a sidelink interface over a relay terminal according to the fifth configuration information.

According to a seventh aspect of the present disclosure, a terminal device is provided. The terminal device includes a memory, a processor, and a program or an instruction that is stored in the memory and that can be run on the processor, where when the program or the instruction is executed by the processor, the steps of the method in the first aspect or the third aspect are implemented.

According to an eighth aspect of the present disclosure, a network device is provided, including a memory, a processor, and a program or an instruction that is stored in the memory and that can be run on the processor, where when the program or the instruction is executed by the processor, the steps of the method in the second aspect are implemented.

According to a ninth aspect of the present disclosure, a readable storage medium is provided. The readable storage medium stores a program or an instruction, and when the program or the instruction is executed by a processor, the steps of the method in the first aspect, the second aspect, or the third aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings:

FIG. 1 is a schematic flowchart of a handover method according to an embodiment of this application;

FIG. 2 is another schematic flowchart of a handover method according to an embodiment of this application;

FIG. 3 is still another schematic flowchart of a handover method according to an embodiment of this application;

DESCRIPTION OF EMBODIMENTS

Figure 4:
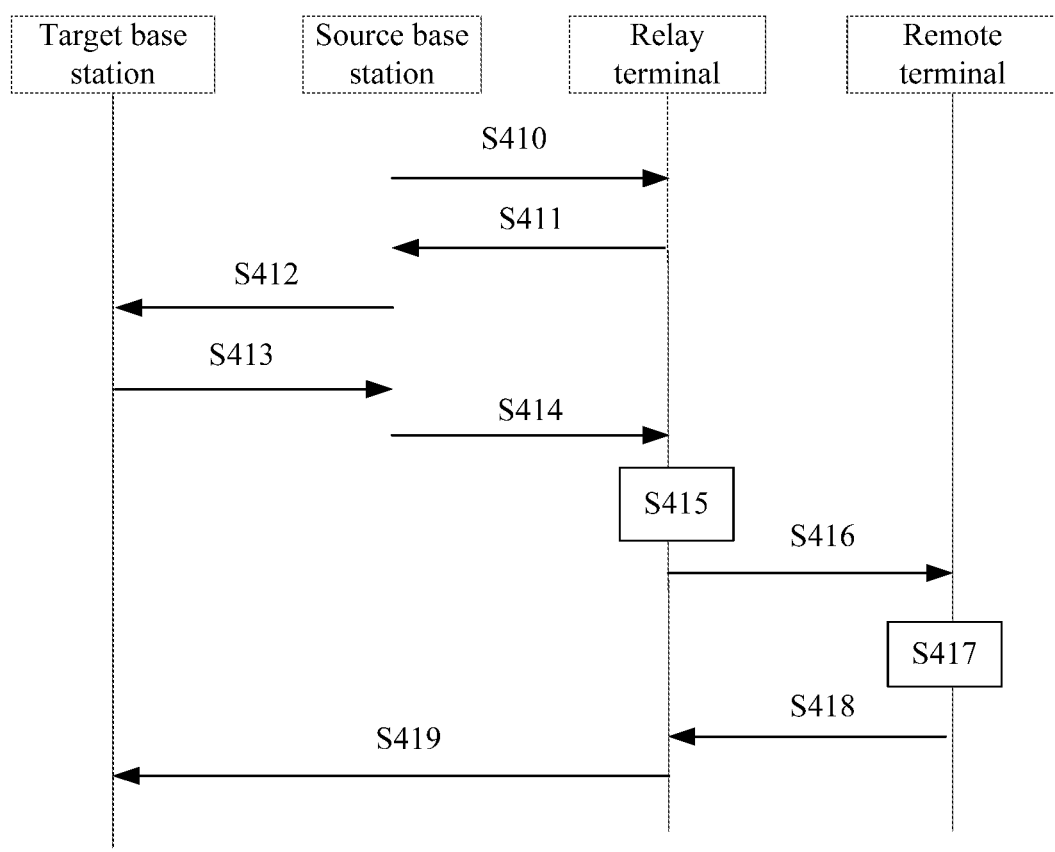
FIG. 4 is still another schematic flowchart of a handover method according to an embodiment of this application.

The following clearly describes the technical solutions in the embodiments of this application with reference to the accompanying drawings in the embodiments of this application. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure can be applied to various communications systems, such as a Global System for Mobile Communications (GSM, Global System of Mobile communication), a Code Division Multiple Access (Code Division Multiple Access, CDMA) system, a Wideband Code Division Multiple Access (WCDMA, Wideband Code Division Multiple Access) system, a general packet radio service (GPRS, General Packet Radio Service) system, a Long Term Evolution (LTE, Long Term Evolution)/Long Term Evolution-advanced (LTE-A, Long Term Evolution-advanced) system, and an NR (New Radio) system.

User equipment (UE, User Equipment), also referred to as a terminal device, a mobile terminal (Mobile Terminal), a mobile user device, or the like, may communicate with one or more core networks through a radio access network (for example, RAN, Radio Access Network). The user equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base transceiver station (BTS, Base Transceiver Station) in the GSM or the CDMA, may be a NodeB (NodeB) in the WCDMA, or may be an evolved NodeB (eNB or e-NodeB, evolutional NodeB) and a 5G base station (gNB) in the LTE. This is not limited in the present disclosure. However, for ease of description, description is provided by using the gNB as an example in the following embodiments.

The following describes in detail the technical solutions provided in the embodiments of the present disclosure with reference to the accompanying drawings.

FIG. 1 is a schematic flowchart of a handover method according to an embodiment of this application. A method 100 may be performed by a terminal device, and the terminal device serves as a relay terminal (relay UE). In other words, the method may be performed by software or hardware installed in the relay terminal. As shown in FIG. 1, the method may include the following steps.

S110. Receive a first message sent by a source cell, where the first message is used to instruct the relay terminal to hand over to a target cell, the first message carries target configuration information in the target cell, and the target configuration information includes first configuration information of the relay terminal and second configuration information of data of a remote terminal on a Uu interface, where the remote terminal is a remote terminal of the relay terminal.

In this embodiment of this application, the target configuration information is used to indicate access configurations of the relay terminal and the remote terminal after the handover to the target cell.

S112. Access the target cell according to the target configuration information.

According to the technical solution provided in this embodiment of this application, a relay terminal receives a first message from a source cell, where the first message instructs the relay terminal to hand over to a target cell and carries target configuration information of the target cell, and the target configuration information includes second configuration information of data of a remote terminal on a Uu interface in addition to first configuration information of the relay terminal, so that when being handed over to the target cell, the relay terminal can hand over the data of the remote terminal to the target cell, thereby avoiding service interruption of the remote terminal and improving user experience.

In the related art, the remote UE may access a network by using the relay UE in a plurality of manners. In one manner, there is a complete protocol stack architecture of various layers between the remote UE and the relay UE, and a base station cannot directly control the remote UE. In other words, a peer end of a protocol stack of each layer of the remote UE is located in the relay UE, and there is only a protocol stack entity corresponding to the relay UE on the base station side, and there is no protocol stack of the remote UE. This architecture is referred to as an L3 sidelink relay architecture.

In another manner, the remote UE is in a connected state, and a serving cell or a serving base station of the relay UE is also a serving cell or a serving base station of the remote UE, or a Pcell of the relay UE may be used as a serving cell of the remote UE. In this manner, a layer 3 protocol stack corresponding to the remote UE, such as radio resource control (Radio Resource Control, RRC) or packet data convergence protocol (Packet Data Convergence Protocol, PDCP), is located on the base station side. And there is only a layer 2 protocol stack or a layer 1 protocol stack, such as radio link control (Radio Link Control, RLC), Media Access Control (Media Access Control, MAC), or a physical layer (PHY), is located between the remote UE and the relay UE, and a control function and a security function related to the remote UE are located on the base station. This architecture may be referred to as an L2 sidelink relay architecture.

The technical solution provided in this embodiment of this application may be applied to at least the foregoing two relay architectures, and a handover solution is provided for UE in the two relay architectures.

In a possible implementation, the first configuration information of the relay terminal may include third configuration information of the relay terminal on a Uu interface of the target cell and first sidelink interface configuration information of the relay terminal in the target cell. For example, the third configuration information may include higher layer configurations of a data radio bearer (Data Radio Bearer, DRB) and a signaling radio bearer (Signaling Radio Bearer, SRB) that are of the relay terminal on the Uu interface, and the first sidelink interface configuration information may include but is not limited to configuration information of a sidelink (sidelink) interface between the relay terminal and the remote terminal (remote UE).

In the foregoing implementation, the accessing, by the relay terminal, the target cell according to the target configuration information in S112 may include: accessing the target cell according to the third configuration information, and reconfiguring a sidelink interface according to the first sidelink interface configuration information.

There is direct RRC signaling between the source cell and the relay UE. Therefore, in a possible implementation, the target configuration information may be executed by an RRC signaling process of the Uu interface of the relay UE, for example, the target configuration information is carried in RRC reconfiguration signaling. The target configuration information may include a configuration of the Uu interface of the relay UE (that is, the third configuration information), configuration information of a sidelink interface of the relay UE (including a sidelink radio bearer (sidelink Radio Bearer, SLRB) configuration and a dedicated resource configuration of the sidelink interface, that is, the first sidelink interface configuration information), and the second configuration information of the data of the remote UE on the Uu interface (including bearer configuration information of the data of the remote UE on the Uu interface of the relay terminal, and information about a mapping between a sidelink bearer or a quality of service (QoS) flow (flow) of the remote terminal and a Uu interface bearer.

In a possible implementation, in the L3 sidelink relay architecture, because there is no RRC signaling between the remote UE and the source cell, new configuration information of the remote UE needs to be sent by the relay UE to the remote UE. Therefore, in this possible implementation, after the first message sent by the source cell is received, the method further includes: sending second sidelink interface configuration information to the remote terminal by using a first sidelink radio resource control (RRC) message, where the second sidelink interface configuration information is sidelink interface configuration information of the remote terminal in the target cell. For example, the relay UE may add the second sidelink interface configuration information to PC5 RRC reconfiguration signaling to be sent to the remote UE. The second sidelink interface configuration information may include configuration information of a sidelink interface of the remote UE (including an SLRB configuration and a dedicated resource configuration of the sidelink interface).

In the foregoing possible implementation, the second sidelink interface configuration information may be obtained by the relay terminal by using an RRC process of the relay terminal. For example, the target configuration information in the first message includes the second sidelink interface configuration information. Alternatively, the relay terminal may receive the target configuration information and determine the configuration information of the sidelink interface of the remote UE.

Alternatively, in another possible implementation, after receiving the first message sent by the source cell, the relay UE may send a notification to the remote terminal, where the notification instructs the relay terminal to hand over to the target cell. In this manner, the remote UE may learn that the relay UE is handed over to the target cell. In the L3 sidelink relay architecture, configuration information of the sidelink interface of the remote UE in a new cell is obtained by the remote UE by using system information block (System Information Block, SIB) information of the target cell or obtained by the remote UE by using preconfiguration information.

In the L3 sidelink relay architecture, the relay UE receives the target configuration information of the source cell, and may immediately perform S112 to perform reconfiguration according to the target configuration information. A bearer of the relay UE on the Uu interface, a bearer and mapping of the data of the remote UE on the Uu interface, and a configuration of the relay UE on a PC5 link may be executed immediately. In addition, in a possible implementation, the relay UE accesses the target cell. After the access succeeds, the relay UE may send reconfiguration complete information to the target cell, to indicate that the handover is completed.

In a possible implementation, to ensure that data of the UE before and after the handover is continuous and lossless, the source cell may instruct the relay UE to perform a corresponding PDCP entity operation. Therefore, in this possible implementation, the first message may further carry an operation instruction of a PDCP entity; and after the receiving a first message sent by a source cell, the method may further include: performing a PDCP reconstruction process or a PDCP data recovery operation according to the operation instruction of the PDCP entity, where the PDCP reconstruction process includes any one of the following: PDCP reconstruction corresponding to data of the relay terminal; or PDCP reconstruction corresponding to data of the relay terminal and PDCP reconstruction corresponding to data of the remote terminal; and the PDCP data recovery operation includes any one of the following: PDCP data recovery corresponding to the data of the relay terminal; or PDCP data recovery corresponding to the data of the relay terminal and PDCP data recovery corresponding to the data of the remote terminal.

For example, in the L2 sidelink relay architecture, because protocol entities at both ends of a PDCP layer corresponding to a DRB or a QoS flow of the data of the remote UE are respectively located in the remote UE and the serving base station, for the relay UE, PDCP reconstruction and data recovery corresponding to the data of the relay UE need to be performed. In the L3 sidelink relay architecture, because the base station cannot directly communicate with the remote UE, the data of the remote UE also has a corresponding bearer on the Uu interface of the relay UE. Therefore, the relay UE needs to perform PDCP reconstruction and data recovery corresponding to the data of the relay UE and the data of the remote UE.

In the foregoing possible implementation, for the L3 sidelink relay architecture, the relay UE may further need to notify the remote UE to perform a corresponding PDCP entity operation. Therefore, in a possible implementation, after the receiving a first message sent by a source cell, the method further includes: sending a second sidelink RRC message to the remote terminal, where the second sidelink RRC message carries a packet data convergence protocol (PDCP) reconstruction instruction or a PDCP data recovery instruction. The second sidelink RRC message and the first sidelink RRC message may be a same message, or may be different messages. This is not specifically limited in this embodiment.

In a possible implementation, for the L2 sidelink relay architecture, the source cell separately sends new configuration information in the target cell to the relay UE and the remote UE. To ensure that the source cell can send the new configuration information to the remote UE, it needs to be ensured that the source cell can successfully send the new configuration information to the remote UE. In this possible implementation, before the accessing the target cell according to the target configuration information, the method further includes: receiving a handover execution message sent by the source cell. That is, after receiving the target configuration information, the relay UE does not immediately perform the handover, but performs the handover after receiving the handover execution message sent by the source cell. After sending the new configuration information to the remote UE, the source cell may send the handover execution message to the relay UE, to ensure that the new configuration information of the remote UE can be successfully sent to the remote UE.

In a possible implementation, for the L2 sidelink relay architecture, the source cell separately sends new configuration information in the target cell to the relay UE and the remote UE. A time point at which the new configuration information arrives at the relay UE may be different from a time point at which the new configuration information arrives at the remote UE. However, reconfiguration complete signaling of the remote UE can be sent to the target cell only after the relay UE accesses the target cell. Therefore, in this possible implementation, after the accessing the target cell, the method further includes: sending indication information to the remote terminal, where the indication information indicates that the relay terminal has accessed the target cell; receiving reconfiguration complete signaling sent by the remote terminal; and sending the reconfiguration complete signaling to the target cell. In this possible implementation, the relay terminal sends the indication information to the remote terminal after accessing the target cell. After receiving the indication information, the remote terminal sends the reconfiguration complete signaling to the target cell by using the relay terminal.

Alternatively, in another possible implementation, the method may further include: receiving reconfiguration complete signaling sent by the remote terminal, where the remote terminal is a remote terminal of the relay terminal; and sending the reconfiguration complete signaling to the target cell after the target cell is accessed. That is, in this possible implementation, after the remote terminal completes reconfiguration, the reconfiguration complete signaling is sent to the target cell by using the relay terminal. After the reconfiguration complete signaling arrives at the relay terminal, the relay terminal does not directly send the reconfiguration complete signaling, but forwards the reconfiguration complete signaling to the target cell after accessing the target cell.

In a possible implementation, after receiving measurement information sent by the relay terminal, the source cell may determine to hand over the relay terminal to the target cell. Therefore, in this possible implementation, before S110, the method further includes: performing measurement according to target measurement configuration information; and reporting measurement information to the source access node when a reporting condition is met.

Optionally, the target measurement configuration information includes any one of the following:

(1) Measurement configuration information configured by a network side in a relay mode. For example, when receiving a relay request of the relay terminal, the network side may change measurement configuration information of the relay terminal by using a reconfiguration message, or the network terminal side may configure two groups of measurement configuration information, which are respectively used in a normal UE mode and a relay mode, and the relay terminal perform selection according to a current state.

(2) Measurement configuration information determined according to the measurement configuration information configured by the network side and a preset offset configured by the network side. For example, the network side may configure one group of measurement configuration information in a normal UE mode, and another additional offset, such as a threshold, that is, may configure a basic threshold and an offset. When the UE is in the normal UE mode, the basic threshold is used, and when the UE works as relay UE, the basic threshold plus the offset is a new threshold.

In the foregoing possible implementation, the reporting condition may include at least one of the following: a reporting period and a reporting trigger event. That is, in actual application, the relay terminal may periodically report the measurement information, or a trigger event may be set, and when the trigger event is detected, the measurement information is reported. Alternatively, the two may be combined. A trigger event may be set at the same time of periodic reporting, and the measurement information is reported when the trigger event is detected. For example, if the trigger event is detected when the reporting period does not arrive, measurement information obtained through current measurement is reported.

In the foregoing possible implementation, the trigger event may be set according to a specific requirement, for example, a signal quality measurement result of a serving cell (that is, the source cell) is greater than a first preset threshold, or a signal quality measurement result of a target cell is greater than that of the source cell.

According to the technical solution provided in this embodiment of this application, the handover of the relay terminal in the L2 relay architecture and the L3 relay architecture can be implemented, thereby ensuring service continuity between the relay terminal and the remote terminal and improving user experience.

FIG. 2 is another schematic flowchart of a handover method according to an embodiment of this application. A method 200 may be performed by a network device. In other words, the method may be performed by software or hardware installed in the network device. As shown in FIG. 2, the method may include the following steps.

S210. Send a first message to a relay terminal, where the first message is used to instruct the relay terminal to hand over to a target cell, the first message carries target configuration information of the relay terminal in the target cell, and the target configuration information includes first configuration information of the relay terminal and second configuration information of data of a remote terminal on a Uu interface, where the remote terminal is a remote terminal of the relay terminal.

The first message is the same as the first message in the method 100. For details, refer to the related descriptions in the method 100.

In a possible implementation, as described in the method 100, the first configuration information of the relay terminal includes third configuration information of the relay terminal on a Uu interface of the target cell and first sidelink interface configuration information of the relay terminal in the target cell.

In a possible implementation, the network device may send the first message to the relay terminal by using RRC signaling, for example, RRC reconfiguration signaling.

In a possible implementation, the first message may further carry sidelink interface configuration information of the remote terminal (that is, configuration information of remote UE on a sidelink interface). For example, in an L3 sidelink relay architecture, there is no RRC connection between the network device and the remote UE. Therefore, the network device may send the sidelink interface configuration information of the remote terminal to the relay terminal, and the relay terminal sends the sidelink interface configuration information to the remote terminal.

In a possible implementation, the method may further include: sending a second message to the remote terminal, where the second message carries fourth configuration information of the remote terminal in the target cell. For example, in an L2 sidelink relay architecture, there is an RRC connection between the network device and the remote UE. Therefore, the network device may send the second message to the remote terminal by using the RRC connection between the network device and the remote UE, where the second message carries the fourth configuration information of the remote terminal in the target cell.

In the foregoing possible implementation, the fourth configuration information includes bearer configuration information of the remote terminal on the Uu interface of the target cell, configuration information of a service data adaptation protocol (Service Data Adaptation Protocol, SDAP) layer, and configuration information of a PDCP layer. In addition, the fourth configuration information may further include sidelink interface configuration information, for example, bearer configuration information of sidelink interface radio link control (SL RLC), and configuration information of RLC and a protocol layer below RLC.

In a possible implementation, after the sending a second message to the remote terminal, the method further includes: sending a handover execution message to the relay terminal. For example, in the L2 sidelink relay architecture, a source cell separately sends the second message to the relay terminal and the remote terminal. To ensure that the second message arrives at the remote terminal through the relay terminal, after sending the second message to the remote terminal, the network device sends the handover execution message to the relay terminal. After receiving the handover execution message, the relay terminal accesses the target cell, so that the second message can be successfully sent to the remote terminal.

Alternatively, in another possible implementation, to ensure that the second message can be successfully sent to the remote terminal, the sending a first message to a relay terminal includes: sending the first message to the relay terminal after receiving acknowledgment feedback information of the relay terminal or the remote terminal for the second message. That is, in this possible implementation, the network device first sends the second message, and after receiving the acknowledgement feedback information of the relay terminal for the second message, the network device may determine that the second message at least arrives at the relay terminal, and then the network device sends the first message to the relay terminal. Alternatively, after receiving the acknowledgement feedback information of the remote terminal for the second message, the network device may determine that the second message has arrived at the remote terminal, and then sends the first message to the relay terminal, to ensure that the second message can be successfully sent to the remote terminal.

In a possible implementation, the source cell and the target cell may not be in a same base station. Therefore, in a possible implementation, before S210, the method further includes: sending a handover request message to a target base station in which the target cell is located, where the handover request message carries related information of the relay terminal, and the handover request message further indicates related information of the remote terminal; and receiving a handover request response message returned by the target base station, where the handover request response message carries the target configuration information.

The related information includes but is not limited to any one of the following: capability information, configuration information, and context information.

Optionally, a manner in which the handover request message indicates the related information of the remote terminal may be: the related information of the remote terminal is carried in the handover request message as additional information of the relay terminal.

For example, in the L3 sidelink relay architecture, the source cell (a source base station) does not need to distinguish the configuration information of the remote UE, but uses configuration information of the relay UE and the configuration information of the remote UE together as configuration information of the relay UE, and sends the configuration information of the relay UE to the target base station. For example, the relay UE establishes a total of eight DRBs, where three DRBs are bearers of the relay UE, and remaining five DRBs are bearers established for transmission of the remote UE on the Uu interface. In this case, configuration information of the eight DRBs may be directly notified to the target base station without distinguishing, so that the target base station performs acceptance and configuration, or the handover request message may carry indication information to indicate that the five DRBs are bearers established for the remote UE, so that the target base station can perform acceptance and configuration more accurately. Alternatively, related information of the remote UE is added to related information of the relay UE for sending together, that is, a main handover object is the relay UE, and the remote UE is additionally handed over together. The information about the relay UE and the information about the remote UE are in an inclusive relationship, and the inclusive relationship may be carried in one piece of signaling.

Alternatively, in another possible implementation, the sending a handover request message to a target base station in which the target cell is located includes: sending a plurality of handover request messages to the target base station in which the target cell is located, where one of the handover request messages carries the related information of the relay terminal, and another handover request message in the plurality of handover request messages carries the related information of the remote terminal.

For example, in the L2 sidelink relay architecture, the information about the remote UE is used independent information, and is sent together with the information about the relay UE. The related information of the relay UE and the related information of the remote UE are in a parallel relationship, and the parallel relationship may be carried in one piece of signaling (that is, the handover request message), or may be separately carried in different signaling. That is, the source base station separately sends the related information of the relay UE and the related information of the remote UE to the target base station by using one handover request message, where the related information of the relay UE is carried in one handover request message, and related information of each remote UE is separately sent to the target base station by using one handover request message.

The configuration information of the relay UE may also include an SLRB configuration, an optional configured grant (configured grant) configuration, and the like of the relay UE in a PC5 link. The configuration information of the remote UE may also include an SLRB configuration, an optional configured grant configuration, and the like of the remote UE in a PC5 link.

When receiving the handover request message sent by the source base station, the target base station accepts the relay UE and the remote UE according to the carried information about the relay UE or optional added information about the remote UE, configures a new configuration, and sends new configuration information (that is, a target configuration) to the source base station. The new configuration information may mainly include:

1. Configuration of the relay UE:
Uu interface configuration of the relay UE;
bearer and configuration of data of the remote UE on the Uu interface of the relay UE; and
PC5 link configuration of the relay UE.
2. Configuration of the remote UE:
PC5 link configuration of the remote UE.

After receiving the new configuration information returned by the target base station, the source base station adds the new configuration information to the first message for sending to the relay terminal, or adds a part of information in the new configuration information to the first message for sending to the relay terminal, and adds another part of information to the second message for sending to the remote terminal. For details, refer to the foregoing descriptions. Details are not described herein again.

In a possible implementation, the network device may determine to initiate a handover after receiving a measurement result reported by the relay terminal. Therefore, before the sending a handover request message to a target base station in which the target cell is located, the method further includes: receiving a measurement result reported by the relay terminal.

When the relay UE works in the source cell, regardless of the L2 relay architecture or the L3 relay architecture, the serving cell can learn of existence of the remote UE and configure the remote UE. This configuration mainly includes a bearer configuration of the data of the remote UE on the Uu interface of the relay UE and a sidelink configuration of the remote UE. For the L2 relay architecture, because an RRC connection is established between the remote UE and a serving cell, the serving cell may further obtain capability information, reporting information, and the like of the remote UE. When the relay UE meets a measurement reporting condition, the relay UE performs measurement reporting to a serving cell of the relay UE. The serving cell determines, according to a measurement reporting state, to hand over the relay terminal and the remote terminal to the target cell, and performs S210.

In a possible implementation, to ensure data continuity and lossless before and after the handover, in a case that the source cell and the target cell are not in a same base station, data forwarding of the UE may be performed. For AM data, a sequence number status transfer (SN status transfer) process may be performed.

For example, for the L3 architecture, because the base station cannot directly communicate with the remote UE, the data of the remote UE also has a corresponding bearer on the Uu interface of the relay UE. For example, DRBs 0-31 of the relay UE correspond to its own data service, DRBs 31-63 of the relay UE corresponds to a data service of remote 1, DRBs 64-95 of the relay UE correspond to a data service of remote 2, and so on. The remote 1 and the remote 2 are UE that communicate with the base station by using the relay UE.

When the relay UE performs a handover, a data DRB of the remote UE connected to the relay UE also needs to perform corresponding data forwarding and SN status transfer. That is, in addition to a bearer of the relay UE of the DRBs 0-31, another bearer corresponding to the remote UE also needs to perform data forwarding and SN status transfer on the source node and the target node as required. For a specific data forwarding and SN status transfer process, a data forwarding and SN status transfer process in the related art may be reused, and details are not described herein.

Through the foregoing data forwarding and SN status transfer, it can be ensured that during the relay handover, the data of the remote UE is continuous and lossless on a link from the relay UE to a serving gNB.

In the L3 architecture, because protocol entities at both ends of a packet data aggregation protocol PDCP layer corresponding to a DRB or a QoS flow of the data are respectively located in the relay UE and the serving base station, Therefore, the first message further carries an operation instruction of a PDCP entity, and the operation instruction of the PDCP entity includes a PDCP reconstruction instruction or a PDCP data recovery instruction. The relay terminal may perform a PDCP reconstruction process or a PDCP data recovery process based on the operation instruction of the PDCP entity. For details, refer to the related descriptions in the foregoing method 100.

For the L2 architecture, because the base station directly communicates with the remote UE, that is, a data bearer PDCP layer of the remote UE and a protocol above are located in the serving base station. When the serving base station changes, corresponding data forwarding and SN status transfer may be performed between a source node and a target node for a bearer of the remote UE. That is, in this case, a data granularity for forwarding between the source base station and the target base station is a DRB or a QoS flow of the remote UE. A specific data forwarding and status transfer process is similar to that in the related art, and details are not described herein.

In the L2 architecture, because protocol entities at both ends of a PDCP layer corresponding to a DRB or a QoS flow of the data are respectively located in the remote UE and the serving base station, the second message sent to the remote terminal may further carry an operation instruction of a PDCP entity, and the operation instruction of the PDCP entity includes a PDCP reconstruction instruction or a PDCP data recovery instruction. The remote terminal may perform a PDCP reconstruction process or a PDCP data recovery process based on the operation instruction of the PDCP entity.

FIG. 3 is still another schematic flowchart of a handover method according to an embodiment of this application. A method 300 may be performed by a remote terminal. In other words, the method may be performed by software or hardware installed in the remote terminal. As shown in FIG. 3, the method may include the following steps.

S310. Obtain fifth configuration information of the remote terminal in a target cell.

S312. Reconfigure a sidelink interface over a relay terminal according to the fifth configuration information.

In a possible implementation, the S310 may include: receiving a third message sent by the relay terminal over a sidelink, where the third message carries the fifth configuration information, and the fifth configuration information includes sidelink interface configuration information of the remote terminal; or after a notification message sent by the relay terminal is received, obtaining the fifth configuration information by using a SIB message or a preconfiguration message, where the notification message instructs the relay terminal to hand over to the target cell.

For example, in an L3 sidelink relay architecture, the remote terminal may obtain the sidelink interface configuration information of the remote terminal from the relay terminal, or may obtain the sidelink interface configuration information of the remote terminal by using the SIB message or the preconfiguration message. For details, refer to the related descriptions in the foregoing method 100 and method 200. Details are not described herein again.

In the foregoing possible implementation, the third message further carries an operation instruction of a PDCP entity, and the operation instruction of the PDCP entity includes a PDCP reconstruction instruction or a PDCP data recovery instruction. The remote terminal performs a PDCP reconstruction process or a PDCP data recovery process with the relay terminal according to the operation instruction.

In another possible implementation, the obtaining fifth configuration information of the remote terminal in a target cell includes: receiving a fourth message sent by a source cell, where the fourth message carries the fifth configuration information, and the fifth configuration information includes Uu interface bearer configuration information, PDCP layer configuration information, SDAP layer configuration information, and sidelink interface configuration information.

For example, in an L2 sidelink relay architecture, the remote terminal may obtain the fifth configuration information from the source cell. In the foregoing possible implementation, the fifth configuration information includes Uu interface bearer configuration information, PDCP layer configuration information, SDAP layer configuration information, and sidelink interface configuration information.

In the foregoing possible implementation, the fourth message further carries an operation instruction of a PDCP entity, and the operation instruction of the PDCP entity includes a PDCP reconstruction instruction or a PDCP data recovery instruction. The remote terminal performs a PDCP reconstruction process or a PDCP data recovery process with a base station according to the operation instruction.

In a possible implementation, after the reconfiguring a sidelink interface over a relay terminal according to the fifth configuration information, the method further includes any one of the following:

(1) Sending reconfiguration complete signaling to the relay terminal. For example, in the L3 sidelink relay architecture, the relay terminal sends reconfiguration signaling to the remote terminal, where the reconfiguration signaling may carry the sidelink interface configuration information of the remote terminal, and after completing the reconfiguration signaling, the remote terminal sends the reconfiguration complete signaling to the relay terminal.

(2) After receiving a notification message sent by the relay terminal, sending the reconfiguration complete signaling to the target cell, where the notification message indicates that the relay terminal has accessed the target cell. For example, in the L2 sidelink relay architecture, after accessing the target cell, the remote terminal sends the reconfiguration complete signaling to the target cell, thereby ensuring that the reconfiguration complete signaling can successfully arrive at the target cell.

(3) Sending the reconfiguration complete signaling to the target cell. For example, in the L2 sidelink relay architecture, after the reconfiguration complete signaling arrives at the relay terminal, the relay terminal may cache the reconfiguration complete signaling, and forwards the reconfiguration complete signaling to the target cell after accessing the target cell.

In a possible implementation, before the obtaining fifth configuration information of the remote terminal in a target cell, the method further includes: receiving indication information sent by the relay terminal, where the indication information indicates that the relay terminal accesses the target cell; and after the reconfiguring a sidelink interface over a relay terminal, the method further includes: sending a response message to the relay terminal. For example, in the L3 sidelink relay architecture, after accessing the target cell, the relay terminal sends the indication information to the remote terminal. After receiving the indication information, the remote terminal obtains sidelink interface configuration information of the target cell by using a SIB message or a preconfiguration message, and sends the response message to the relay terminal after reconfiguration is performed, so that the relay terminal can learn that the remote terminal has completed reconfiguration.

FIG. 4 is still another schematic flowchart of a handover method according to an embodiment of this application. A method 400 may be performed by a remote terminal, a source base station, a target base station, and a remote terminal. In other words, the method may be performed by software or hardware installed in the relay terminal, the source base station, the target base station, and the remote terminal. In the method 400, an L3 sidelink relay architecture is used. As shown in FIG. 4, the method may include the following steps.

S410. The source base station sends measurement configuration information to the relay terminal.

In this embodiment, relay UE is RRC connected UE when providing a service for remote UE. The relay UE may obtain a related measurement configuration in a manner similar to that of related UE in a connected state, to monitor link quality of a cell and a neighboring cell to meet a mobility requirement.

The measurement configuration information may be implemented in a related manner in the method 100. For details, refer to the descriptions in the method 100.

S411. The relay terminal performs measurement, and reports a measurement result to the source base station when a measurement trigger condition is met.

S412. The source base station sends, according to the reported measurement result, a handover request message to the target base station in which a target cell is located.

In addition to carrying capability information, configuration information, and UE context information of the relay UE, the handover request message may explicitly or implicitly carry related information of the remote UE. In the implicit carrying manner, configuration information of the relay UE and configuration information of the remote UE are taken as configuration information of the relay UE and sent to the target base station. For example, the relay UE establishes a total of eight DRBs, where three DRBs are bearers of the relay UE, and remaining five DRBs are bearers established for transmission of the remote UE on a Uu interface. In this case, configuration information of the eight DRBs may be directly notified to the target base station without distinguishing, so that the target base station can perform acceptance and configuration. Alternatively, the handover request message may carry indication information, to indicate that the remaining five DRBs are bearers established for the remote UE, so that the target base station can perform acceptance and configuration more accurately.

In the manner of explicitly carrying the related information of the remote UE, the handover request message indicates which information belongs to the relay UE and which information belongs to the remote UE. For example, in addition to carrying capability information, configuration information, and UE context information of the relay UE, the handover request message further carries related information of the remote UE, for example, capability information, configuration information, and UE context information of the remote UE. Alternatively, the information about the remote UE may be added to the information about the relay UE to be carried in the handover request message, that is, a handover object is the relay UE, and the remote UE is additionally handed over together. The information about the relay UE and the information about the remote UE are in an inclusive relationship.

S413. The target base station accepts the relay UE and the remote UE according to the related information of the relay UE and the related information of the remote UE that are carried or indicated in the handover request message, determines new configuration information, and sends the new configuration information to the source base station.

The new configuration information mainly includes:
1. Configuration of the relay UE:
Uu interface configuration of the relay UE;
bearer and configuration of data of the remote UE on the Uu interface of the relay UE; and
PC5 link configuration of the relay UE.
2. Configuration of the remote UE:
PC5 link configuration of the remote UE.

S414. The source base station sends reconfiguration signaling to the relay terminal, where the reconfiguration signaling carries the new configuration information.

In a possible implementation, as described in the foregoing method 100, the reconfiguration signaling may carry the configuration of the relay UE in the new configuration information without the configuration of the remote UE. The relay terminal notifies the remote terminal to obtain the PC5 link configuration of the remote UE from the target cell. In this embodiment, an example in which the reconfiguration signaling carries the configuration of the remote UE is used for description.

In a possible implementation, to ensure data continuity and lossless before and after the handover, the reconfiguration signaling may further carry an operation instruction of a PDCP entity. For example, when the relay terminal is handed over from the source cell to a target cell of another base station, a serving node changes. Therefore, a security update is required, and the operation instruction of the PDCP entity carried in the reconfiguration signaling is a PDCP reconstruction instruction. If the serving node does not change, a security update is not required, and the operation instruction of the PDCP entity carried in the reconfiguration signaling is a PDCP data recovery instruction.

S415. The relay terminal accesses the target cell according to the new configuration information, and reconfigures a sidelink interface.

Alternatively, the relay terminal may access the target cell according to a Uu interface configuration of the relay UE and a bearer and a configuration of data of the remote UE on the Uu interface of the relay UE in the new configuration information, and reconfigure the sidelink interface by using a PC5 link configuration of the relay UE in the new configuration information.

In addition, if the reconfiguration signaling carries the operation instruction of the PDCP entity, the relay terminal performs a corresponding operation according to the operation instruction. Alternatively, the data of the remote terminal also has a corresponding bearer on the Uu interface of the relay terminal. Therefore, when the relay UE is handed over, a data DRB of the remote UE connected to the relay UE also needs to perform corresponding data forwarding and SN status transfer. Therefore, a PDCP reconstruction process includes PDCP reconstruction corresponding to data of the relay terminal and PDCP reconstruction corresponding to data of the remote terminal. A PDCP data recovery operation also includes PDCP data recovery corresponding to the data of the relay terminal and PDCP data recovery corresponding to the data of the remote terminal.

S416. The relay terminal sends a PC5 link configuration of the remote UE to the remote terminal by using a PC5 RRC message.

In specific application, as described in the foregoing method 100, the relay terminal may also notify the remote UE that the handover to the target cell occurs, and the remote UE obtains a new configuration in the target cell. Alternatively, a PC5 link configuration of UE that has no dedicated RRC connection may be obtained by using a SIB message (UE that can camp on a V2X frequency obtains the configuration by using the SIB message) or a preconfiguration message (UE that is offline to the V2X frequency obtains the configuration by using only preconfiguration information).

In a possible implementation, there is also a peer PDCP entity between the remote UE and the relay UE to maintain data retransmission and connection between the remote UE and the relay UE. Because neither the relay UE nor the remote UE changes, a state of the PDCP entity may continue. However, because a serving node changes, a related configuration or a security parameter may change, and a reconstruction operation or a data recovery operation between PDCP entities on the PC5 link may need to be performed. Details are as follows:

In a first case, configurations at two ends of the PC5 link do not change before and after the handover, and a security parameter does not need to be updated. In this case, a link between the remote UE and the relay UE may continue to be performed after the handover, and no change needs to be performed.

In a second case, configurations at two ends of the PC5 link change before and after the handover, but a security parameter does not need to be updated. In this case, a link between the remote UE and the relay UE needs to perform a synchronous reconfiguration process without changing the security parameter, the PC5 RRC message sent by the relay terminal may carry a PDCP data recovery instruction, and the remote UE performs a data recovery (data recovery) process according to the instruction.

In a third case, configurations at two ends of the PC5 link change or remain unchanged before and after the handover, and most importantly, a security parameter needs to be updated. In this case, a PDCP reconstruction process needs to be performed, and the source base station may instruct the relay terminal to, for example, add the PDCP data reconstruction instruction to the reconfiguration signaling, or the relay terminal may solely determine whether to perform PDCP reconstruction. Therefore, in this case, the relay terminal may add the PDCP reconstruction instruction to the sent PC5 RRC message, and the remote UE performs a PDCP reconstruction process according to the instruction.

S417. The remote UE reconfigure a PC5 link interface according to the received PC5 link configuration.

After receiving the new PC5 link configuration, the remote UE immediately apply the new configuration to communicate with the relay UE.

S418. After reconfiguration is completed, the remote UE sends reconfiguration complete signaling to the relay UE.

S419. The relay UE sends reconfiguration complete information to the target base station to indicate that the handover is completed.

Figure 5:
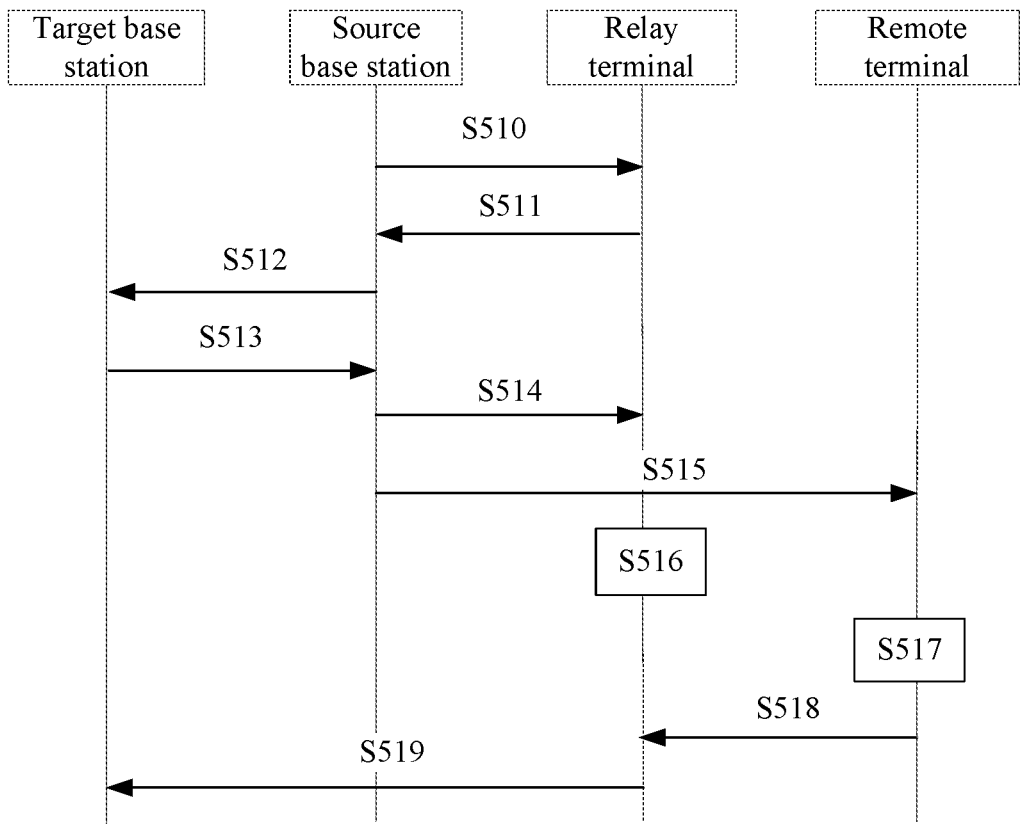
FIG. 5 is still another schematic flowchart of a handover method according to an embodiment of this application.

FIG. 5 is still another schematic flowchart of a handover method according to an embodiment of this application. A method 500 may be performed by a relay terminal, a source base station, a target base station, and a remote terminal. In other words, the method may be performed by software or hardware installed in the relay terminal, the source base station, the target base station, and the remote terminal. In the method 500, an L2 sidelink relay architecture is used. As shown in FIG. 5, the method may include the following steps.

S510 to S513 are basically the same as S410 to S413, except that in this embodiment, in S512, the source base station sends a handover request message to the target base station, and when the handover request message indicates related information of the remote UE, the related information of the remote UE may be used as independent information and carried in one handover request message, that is, a plurality of handover request messages are sent to the target base station. For details, refer to the related descriptions in the method 200.

S514. The source base station sends first reconfiguration signaling to the relay terminal, where the reconfiguration signaling carries a configuration of the relay UE in the new configuration information, which may include a Uu interface configuration of the relay UE, a bearer and a configuration of data of the remote UE on a Uu interface of the relay UE, and a PC5 link configuration of the relay UE.

S515. The source base station sends second reconfiguration signaling to the remote terminal, where the second reconfiguration signaling carries configuration information of the remote terminal in the target cell.

In specific application, the S514 and the S515 may be performed at the same time, or the S515 may be performed first, and S514 is performed after acknowledgement feedback information of the relay terminal or the remote terminal for the second reconfiguration signaling is received.

S516. The relay terminal accesses the target cell according to the first reconfiguration signaling sent by the source base station, and reconfigures a sidelink interface.

In specific application, if both the S514 and the S515 may be performed at the same time. In a possible implementation, to ensure that the second reconfiguration signaling can be successfully sent to the remote terminal, the relay terminal does not immediately perform a handover after receiving the first reconfiguration signaling, but waits for a handover execution message sent by the source base station, and then performs the handover after receiving the handover execution message, that is, accesses the target cell and then reconfigures the sidelink interface. In this implementation, the source base station may send the handover execution message after sending the second reconfiguration signaling or after receiving the ACK message, so that the remote terminal can receive the second reconfiguration signaling before the relay terminal is handed over to the target cell.

After receiving the first reconfiguration signaling, the relay UE initiates an access process to the target cell, and mainly accesses the target cell by using a random access process, and sends reconfiguration complete signaling to the target cell. In addition, the sidelink interface is further reconfigured. Reconfiguration of the sidelink interface is completed according to a new sidelink interface configuration in the target cell. In this process, the reconfiguration signaling may be sent to the remote UE, and the remote UE is notified to perform reconfiguration.

In a possible implementation, to ensure data continuity and lossless before and after the handover, the first reconfiguration signaling may further carry an operation instruction of a PDCP entity, for example, a PDCP reconstruction instruction or a PDCP data recovery instruction. After receiving the first reconfiguration signaling, the relay terminal may perform a corresponding PDCP data reconstruction process or a PDCP data recovery process according to the operation instruction of the PDCP entity. A specific process is similar to S416, except that PDCP reconstruction or PDCP data recovery corresponding to data of the relay terminal is performed in S516.

S517. The remote terminal reconfigures a sidelink interface according to the second reconfiguration signaling sent by the source base station.

After receiving the second reconfiguration signaling, the remote UE may immediately reconfigure the sidelink interface, that is, send PC5 RRC signaling to the relay UE for reconfiguration of a PC5 interface, and immediately enable a new configuration when the reconfiguration signaling is successfully sent.

Alternatively, after receiving the instruction from the relay UE to the remote UE, the remote UE reconfigures the sidelink interface. The relay UE may explicitly carry, in the PC5 RRC signaling, indication information indicating a behavior of reconfiguring a new cell, or the relay UE may send reconfiguration information of the PC5 link to the remote UE, and receive the reconfiguration information. The remote UE considers that the relay UE is also ready for the handover or has executed the access to the target node.

In a possible implementation, to ensure data continuity and lossless before and after the handover, the second reconfiguration signaling may further carry an operation instruction of a PDCP entity, and the operation instruction of the PDCP entity includes a PDCP reconstruction instruction or a PDCP data recovery instruction.

The source base station adds the corresponding operation instruction of the PDCP entity, such as the PDCP reconstruction instruction or the PDCP data recovery instruction, to the second reconfiguration signaling according to specific application. After receiving the second reconfiguration signaling, the remote terminal performs a PDCP reconstruction process or a PDCP data recovery process on the data of the remote terminal.

In an L2 sidelink relay architecture, there is no corresponding PDCP entity between the remote UE and the relay UE to maintain data retransmission and connection between the remote UE and the relay UE. There is only an RLC bearer (RLC bearer) between the relay UE and the remote UE. In this embodiment, for different cases, the RLC bearer has different processing:

In a first case, configurations of the RLC bearer at two ends of the PC5 link do not change before and after the handover. In this case, a link between the remote UE and the relay UE may continue to be performed after the handover, and no change needs to be performed.

In a second case, configurations of the RLC bearer at two ends of the PC5 link change before and after the handover. In this case, a link between the remote UE and the relay UE needs to perform a synchronization reconfiguration process, perform resetting and reconfiguration of each layer according to an execution process in the related art, for example, a MAC layer and an RLC layer, and perform data transmission for the remote UE after the handover by using a reset new entity. In this case, if information needs to be carried in PC5 RRC signaling interaction for determining whether the corresponding RLC bearer needs to be reconfigured, for example, a new configuration, an RLC/MAC entity is reset, a new configuration is performed, and a new entity is established to continue data transmission.

S518. The remote terminal sends reconfiguration complete signaling to the target cell.

In a possible implementation, in S516, after successfully accessing the target cell, the relay UE sends an indication to the remote UE. The remote UE allows sending of the reconfiguration complete signaling to the target cell only after receiving the indication of the relay UE. The indication information may be one piece of dedicated information or reused existing signaling. For example, it can be agreed in advance that the relay UE sends PC5 reconfiguration information to the remote UE only after the access to the target cell is completed, so as to request to reconfigure the sidelink interface. Information indicating that the relay UE has accessed the target cell may be explicitly or implicitly carried. For example, the information is indicated by using a field in the PC5 reconfiguration information, or the PC5 reconfiguration information does not include the indication information. If the sidelink reconfiguration signaling is received, it indicates that the access of the relay UE is completed.

Alternatively, in another possible implementation, after reconfiguring the sidelink interface, the remote UE sends RRC reconfiguration complete signaling. The relay UE first caches the signaling, and in S516, the relay UE successfully accesses the target cell and then performs S519.

S519. The relay terminal forwards, to the target base station, the reconfiguration complete signaling sent by the remote terminal.

Figure 6:
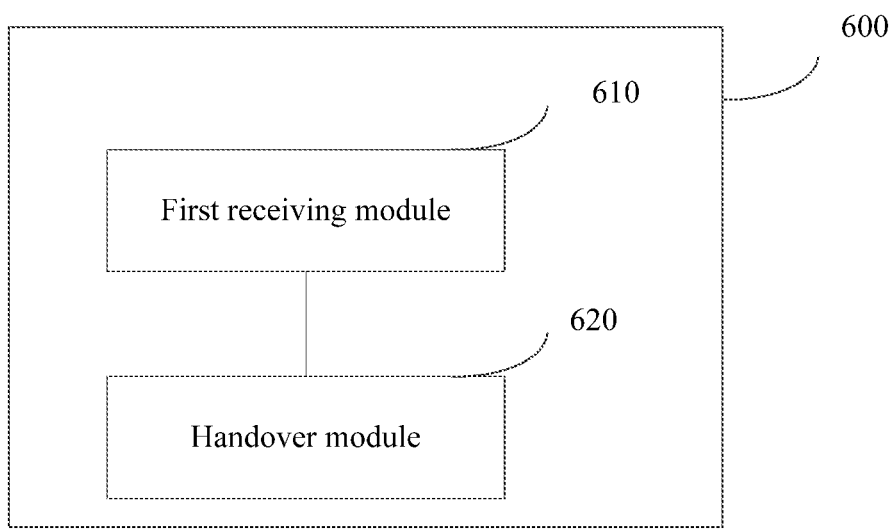
FIG. 6 is a schematic structural diagram of a handover apparatus according to an embodiment of this application.

FIG. 6 is a schematic structural diagram of a handover apparatus according to an embodiment of this application. As shown in FIG. 6, a handover apparatus 600 includes: a first receiving module 610, configured to receive a first message sent by a source cell, where the first message is used to instruct a relay terminal to hand over to a target cell, the first message carries target configuration information of the target cell, and the target configuration information includes first configuration information of the relay terminal and second configuration information of data of a remote terminal on a Uu interface, where the remote terminal is a remote terminal of the relay terminal; and a handover module 620, configured to access the target cell according to the target configuration information.

In a possible implementation, the first configuration information of the relay terminal includes third configuration information of the relay terminal on a Uu interface of the target cell and first sidelink interface configuration information of the relay terminal in the target cell; and that the handover module accesses the target cell according to the target configuration information includes: accessing the target cell according to the third configuration information, and reconfiguring a sidelink interface according to the first sidelink interface configuration information.

In a possible implementation, the handover apparatus further includes: a first sending module, configured to: after the first message sent by the source cell is received, send second sidelink interface configuration information to the remote terminal by using a first sidelink radio resource control RRC message, where the second sidelink interface configuration information is sidelink interface configuration information of the remote terminal; or configured to: after the first message sent by the source cell is received, send a notification to the remote terminal, where the notification instructs the relay terminal to hand over to the target cell.

In a possible implementation, the target configuration information further includes the second sidelink interface configuration information.

In a possible implementation, the first message further carries an operation instruction of a PDCP entity; and the handover module is further configured to: after the first message sent by the source cell is received, perform a PDCP reconstruction process or a PDCP data recovery operation according to the operation instruction of the PDCP entity, where the PDCP reconstruction process includes any one of the following: PDCP reconstruction corresponding to data of the relay terminal; or PDCP reconstruction corresponding to data of the relay terminal and PDCP reconstruction corresponding to data of the remote terminal; and the PDCP data recovery operation includes any one of the following: PDCP data recovery corresponding to the data of the relay terminal; or PDCP data recovery corresponding to the data of the relay terminal and PDCP data recovery corresponding to the data of the remote terminal.

In a possible implementation, the first sending module is further configured to: after the first message sent by the source cell is received, send a second sidelink RRC message to the remote terminal, where the second sidelink RRC message carries a PDCP reconstruction instruction or a PDCP data recovery instruction.

In a possible implementation, the first receiving module is further configured to: before the target cell is accessed according to the target configuration information, receive a handover execution message sent by the source cell.

In a possible implementation, the apparatus further includes: a second sending module, configured to send indication information to the remote terminal, where the indication information indicates that the relay terminal has accessed the target cell; and a second receiving module, configured to receive reconfiguration complete signaling sent by the remote terminal, where the second sending module is further configured to send the reconfiguration complete signaling to the target cell.

In a possible implementation, the apparatus further includes: a third receiving module, configured to receive reconfiguration complete signaling sent by the remote terminal, where the remote terminal is a remote terminal of the relay terminal; and a third sending module, configured to send the reconfiguration complete signaling to the target cell after the target cell is accessed.

In a possible implementation, the apparatus further includes: a measurement module, configured to: before the first message sent by the source cell is received, perform measurement according to target measurement configuration information, and report measurement information to the source access node when a reporting condition is met.

In a possible implementation, the target measurement configuration information includes any one of the following:
measurement configuration information configured by a network side in a relay mode; and
measurement configuration information determined according to the measurement configuration information configured by the network side and a preset offset configured by the network side.

In a possible implementation, the second configuration information includes bearer configuration information of the data of the remote terminal on a Uu interface of the relay terminal, and information about a mapping between a sidelink bearer or a QoS flow of the remote terminal and a Uu interface bearer.

The handover apparatus provided in this embodiment of this application may be disposed in a relay terminal, and can implement the processes implemented by the relay terminal in the method embodiments in FIG. 1 to FIG. 5 and achieve a same effect. To avoid repetition, details are not described herein again.

Figure 7:
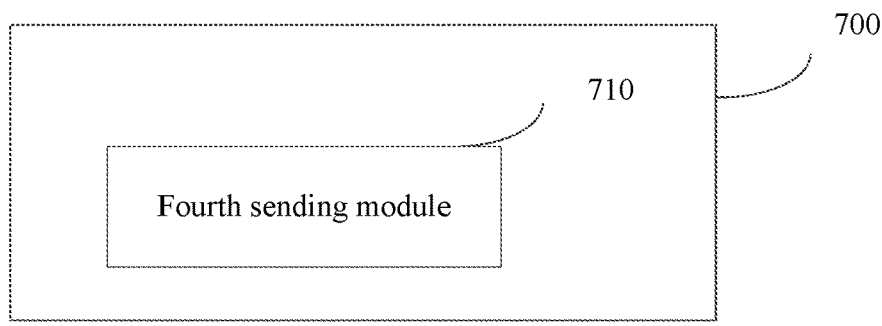
FIG. 7 is another schematic structural diagram of a handover apparatus according to an embodiment of this application.

FIG. 7 is another schematic structural diagram of a handover apparatus according to an embodiment of this application. As shown in FIG. 7, a handover apparatus 700 includes: a fourth sending module 710, configured to send a first message to a relay terminal, where the first message is used to instruct the relay terminal to hand over to a target cell, the first message carries target configuration information of the relay terminal in the target cell, and the target configuration information includes first configuration information of the relay terminal and second configuration information of data of a remote terminal on a Uu interface, where the remote terminal is a remote terminal of the relay terminal.

In a possible implementation, the first configuration information of the relay terminal includes third configuration information of the relay terminal on a Uu interface of the target cell and first sidelink interface configuration information of the relay terminal in the target cell.

In a possible implementation, the first message further carries an operation instruction of a PDCP entity, and the operation instruction of the PDCP entity includes a PDCP reconstruction instruction or a PDCP reset instruction.

In a possible implementation, the target configuration information further includes sidelink interface configuration information of the remote terminal.

In a possible implementation, the fourth sending module is further configured to send a second message to the remote terminal, where the second message carries fourth configuration information of the remote terminal in the target cell.

In a possible implementation, the fourth configuration information includes sidelink interface configuration information.

In a possible implementation, the fourth sending module is further configured to send a handover execution message to the relay terminal after sending the second message to the remote terminal.

In a possible implementation, the sending a first message to a relay terminal includes: sending, the first message to the relay terminal after receiving acknowledgment feedback information of the relay terminal or the remote terminal for the second message.

In a possible implementation, before sending the first message to the relay terminal, the fourth sending module is further configured to send a handover request message to a target base station in which the target cell is located, where the handover request message carries related information of the relay terminal, and the handover request message further indicates related information of the remote terminal; and the apparatus further includes a fourth receiving module, configured to receive a handover request response message returned by the target base station, where the handover request response message carries the target configuration information.

In a possible implementation, that the handover request message further indicates related information of the remote terminal includes: the related information of the remote terminal is carried in the handover request message as additional information of the relay terminal.

In a possible implementation, that the fourth sending module sends the handover request message to the target base station in which the target cell is located includes: sending a plurality of handover request messages to the target base station in which the target cell is located, where one of the handover request messages carries the related information of the relay terminal, and another handover request message in the plurality of handover request messages carries the related information of the remote terminal.

In a possible implementation, the apparatus further includes: a receiving module, configured to: before the handover request message is sent to the target base station in which the target cell is located, receive a measurement result reported by the relay terminal.

The handover apparatus provided in this embodiment of this application may be disposed in a network device, and can implement the processes implemented by the network device in the method embodiments in FIG. 1 to FIG. 5 and achieve a same effect. To avoid repetition, details are not described herein again.

Figure 8:
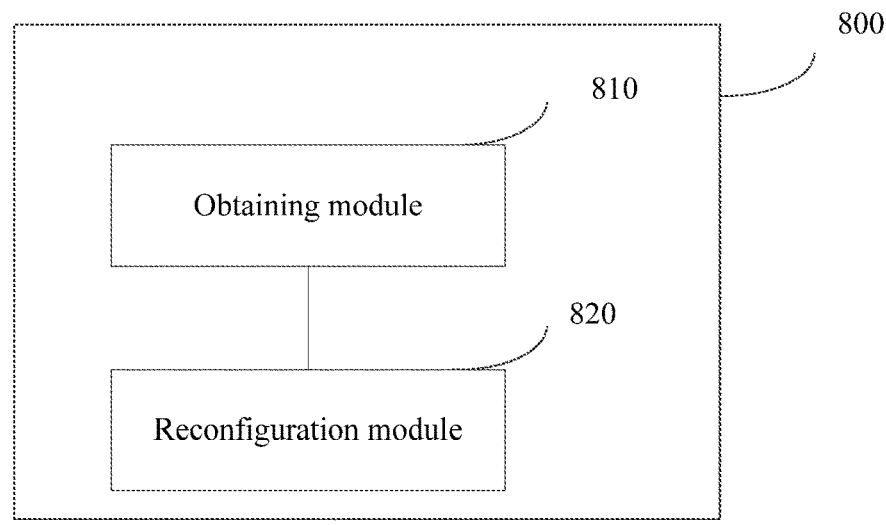
FIG. 8 is still another schematic structural diagram of a handover apparatus according to an embodiment of this application.

FIG. 8 is another schematic structural diagram of a handover apparatus according to an embodiment of this application. As shown in FIG. 8, a handover apparatus 800 includes: an obtaining module 810, configured to obtain fifth configuration information of a remote terminal in a target cell; and a reconfiguration module 820, configured to reconfigure a sidelink interface over a relay terminal according to the fifth configuration information.

In a possible implementation, the third message further carries an operation instruction of a PDCP entity, and the operation instruction of the PDCP entity includes a PDCP reconstruction instruction or a PDCP data recovery instruction.

In a possible implementation, that the obtaining module 810 obtains the fifth configuration information of the remote terminal in the target cell includes: receiving a fourth message sent by a source cell, where the fourth message carries the fifth configuration information, and the fifth configuration information includes Uu interface bearer configuration information, PDCP layer configuration information, service data adaptation protocol SDAP layer configuration information, and sidelink interface configuration information.

In a possible implementation, the fourth message further carries an operation instruction of a PDCP entity, and the operation instruction of the PDCP entity includes a PDCP reconstruction instruction or a PDCP data recovery instruction.

In a possible implementation, after reconfiguring the sidelink interface over the relay terminal according to the fifth configuration information, the reconfiguration module 820 is further configured to perform any one of the following:

sending reconfiguration complete signaling to the relay terminal;

after the notification message sent by the relay terminal is received, send the reconfiguration complete signaling to the target cell, where the notification message indicates that the relay terminal has accessed the target cell; and sending the reconfiguration complete signaling to the target cell.

In a possible implementation, the apparatus further includes: a fifth receiving module, configured to: before the fifth configuration information of the remote terminal in the target cell is obtained, receive indication information sent by the relay terminal, where the indication information indicates that the relay terminal accesses the target cell; and a fifth sending module, configured to send a response message to the relay terminal after the sidelink interface over the relay terminal is reconfigured.

The handover apparatus provided in this embodiment of this application may be disposed in a remote terminal, and can implement the processes implemented by the remote terminal in the method embodiments in FIG. 1 to FIG. 5 and achieve a same effect. To avoid repetition, details are not described herein again.

Figure 9:
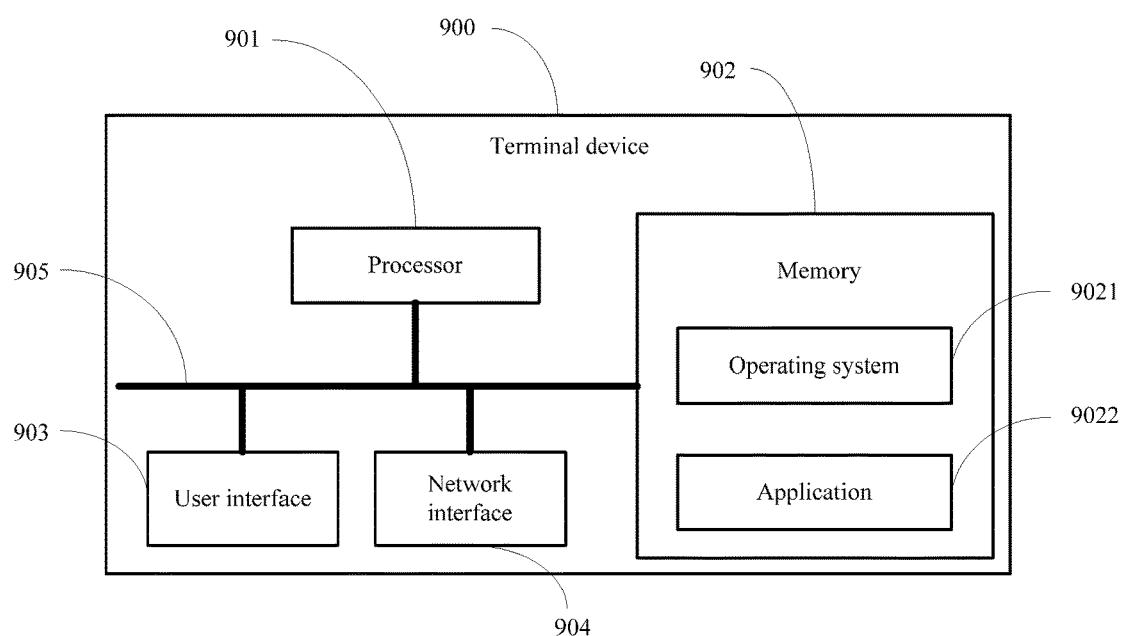
FIG. 9 is a schematic structural diagram of a terminal device according to an embodiment of this application.

FIG. 9 is a block diagram of a terminal device according to an embodiment of this application. A terminal device 900 shown in FIG. 9 includes at least one processor 901, a memory 902, at least one network interface 904, and a user interface 903. All components of the terminal device 900 are coupled together by using the bus system 905. It can be understood that the bus system 905 is configured to implement a connection and communication between these components. In addition to a data bus, the bus system 905 may include a power bus, a control bus, and a status signal bus. However, for clear description, various types of buses in FIG. 9 are marked as the bus system 905.

The user interface 903 may include a display, a keyboard, or a clicking device (for example, a mouse, a trackball (trackball)), a touch panel, or a touchscreen.

It can be understood that the memory 902 in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synch Link DRAM, SLDRAM), and a direct rambus random access memory (Direct Rambus RAM, DR RAM). The memory 902 in the system and the method that are described in the embodiments of this application is to include but is not limited to these memories and a memory of any other proper type.

In some implementation manners, the memory 902 stores the following element, an executable module or a data structure, or a subset thereof, or an extension set thereof: an operating system 9021 and an application 9022.

The operating system 9021 includes various system programs, for example, a framework layer, a kernel library layer, and a driver layer. The operating system 9021 is configured to implement various basic services and process hardware-based tasks. The application 9022 includes various applications, for example, a media player (Media Player), and a browser (Browser), to implement various application services. A program for implementing the method in the embodiments of this application may be included in the application 9022.

In this embodiment of this application, the terminal device 900 further includes a program or an instruction that is stored in the memory 902 and that can be run on the processor 901, and when the program or the instruction is executed by the processor 901, the following steps are implemented:

receiving a first message sent by a source cell, where the first message is used to instruct the relay terminal to hand over to a target cell, the first message carries target configuration information in the target cell, and the target configuration information includes first configuration information of the relay terminal and second configuration information of data of a remote terminal on a Uu interface, where the remote terminal is a remote terminal of the relay terminal; and accessing the target cell according to the target configuration information.

Alternatively, when the program or the instruction is executed by the processor 901, the following steps are implemented:

obtaining fifth configuration information of the remote terminal in a target cell; and reconfiguring a sidelink interface over a relay terminal according to the fifth configuration information.

The methods disclosed in the foregoing embodiments of this application may be applied to the processor 901, or may be implemented by the processor 901. The processor 901 may be an integrated circuit chip and has a signal processing capability. During implementation, each step of the foregoing method may be completed by using an integrated logic circuit of hardware in the processor 901 or an instruction in a form of software. The processor 901 may be a general purpose processor, a digital signal processor (Digital Signal Processor, DSP), an application specific integrated circuit (Application Specific Integrated Circuit, ASIC), a field programmable gate array (Field Programmable Gate Array, FPGA), another programmable logic device, a discrete gate, a transistor logic device, or a discrete hardware component.

The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. A software module may be located in a mature computer-readable storage medium in the art, such as a random access memory, a flash memory, a read-only memory, a programmable read-only memory, an electrically erasable programmable memory, a register, or the like. The computer-readable storage medium is located in the memory 902, and the processor 901 reads information in the memory 902 and completes the steps in the foregoing method in combination with hardware of the processor 901. Alternatively, the computer-readable storage medium stores a computer program, and when the computer program is executed by the processor 901, the steps of the foregoing method 100 are implemented.

It can be understood that the embodiments described in the embodiments of this application may be implemented by hardware, software, firmware, middleware, microcode, or a combination thereof. For hardware implementation, a processing unit may be implemented in one or more Application Specific Integrated Circuits (Application Specific Integrated Circuits, ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general purpose processors, controllers, microcontrollers, microprocessors, or other electronic units or a combination thereof used to perform the functions in the present disclosure.

For software implementation, the technology in the embodiments of this application may be implemented through modules (for example, procedures or functions) that perform the functions in the embodiments of this application. Software code may be stored in a memory and executed by a processor. The memory may be implemented in the processor or outside the processor.

The terminal device 900 can implement the processes implemented by the relay terminal or the remote terminal in FIG. 1 to FIG. 5. To avoid repetition, details are not described herein again.

Figure 10:
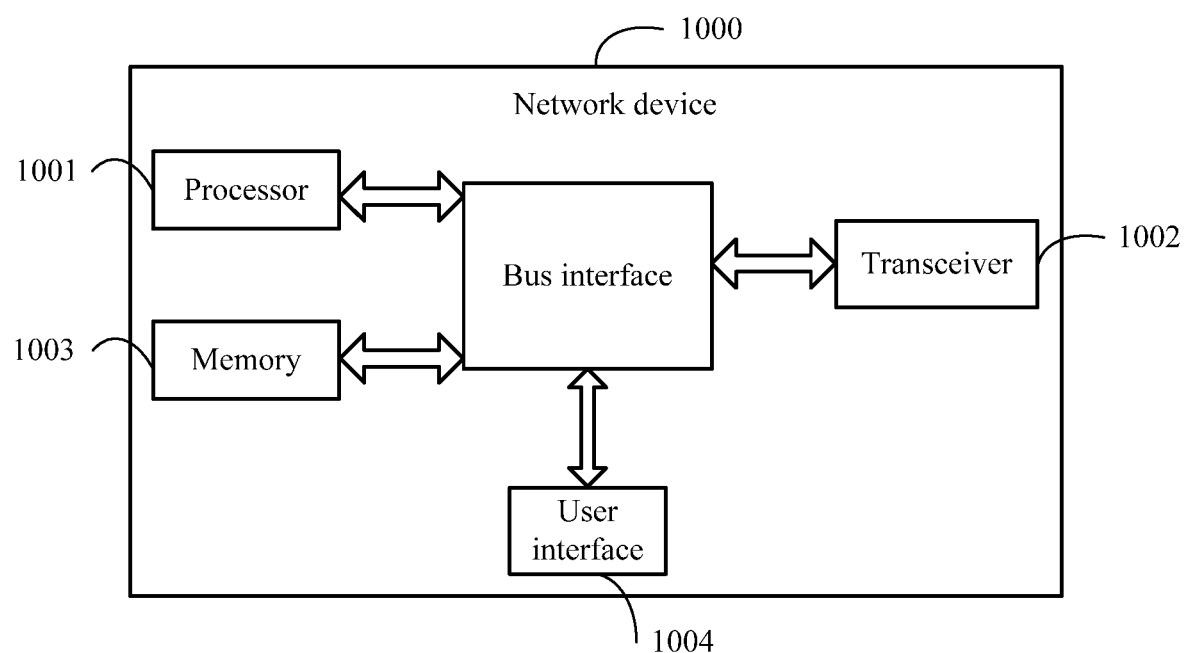
FIG. 10 is a schematic structural diagram of a network device according to an embodiment of this application.

Referring to FIG. 10, FIG. 10 is a structural diagram of a network device to which the embodiments of this application are applied, which can be used as a network device to implement details of the methods 100 to 500, and achieve a same effect. As shown in FIG. 10, a network side device 1000 includes a processor 1001, a transceiver 1002, a memory 1003, a user interface 1004, and a bus interface.

In this embodiment of this application, the network device 1000 further includes a program or an instruction that is stored in the memory 1003 and can be run on the processor 1001. When the program or the instruction is executed by the processor 1001, the following step is implemented: sending a first message to a relay terminal, where the first message is used to instruct the relay terminal to hand over to a target cell, the first message carries target configuration information of the relay terminal in the target cell, and the target configuration information includes first configuration information of the relay terminal and second configuration information of data of a remote terminal on a Uu interface, where the remote terminal is a remote terminal of the relay terminal.

In FIG. 10, a bus architecture may include any quantity of interconnected buses and bridges. Alternatively, various circuits of one or more processors represented by the processor 1001 and a memory represented by the memory 1003 are interconnected. The bus architecture may further link various other circuits such as a peripheral device, a voltage regulator, and a power management circuit. These are well known in the art, and therefore are not further described in this specification. A bus interface provides an interface. The transceiver 1002 may be a plurality of components. To be specific, the transceiver 1002 includes a transmitter and a receiver, and provides a unit configured to communicate with various other apparatuses on a transmission medium. For different user equipment, a user interface 1004 may be an interface that can externally or internally connect to a needed device, and the connected device includes but is not limited to a keypad, a display, a loudspeaker, a microphone, and a joystick.

The processor 1001 is responsible for bus architecture management and general processing. The memory 1003 may store data used by the processor 1001 when the processor 1001 performs an operation.

The network device 1000 can implement the processes implemented by the network device in FIG. 1 to FIG. 5 and achieve a same effect. To avoid repetition, details are not described herein again.

An embodiment of this application further provides a readable storage medium. The readable storage medium stores a program or an instruction, and when the program or the instruction is executed by a processor, the processes of the foregoing embodiment in FIG. 1 to FIG. 5 are implemented and a same technical effect can be achieved. To avoid repetition, details are not described herein again. The readable storage medium is, for example, a read-only memory (Read-only Memory, ROM for short), a random access memory (Random Access Memory, RAM for short), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A handover method, comprising:
receiving, by a relay terminal, a first message sent by a source cell, wherein the first message is used to instruct the relay terminal to hand over to a target cell, the first message carries target configuration information in the target cell, and the target configuration information comprises first configuration information of the relay terminal and second configuration information of data of a remote terminal on a Uu interface, wherein the remote terminal is a remote terminal of the relay terminal; and
accessing, by the relay terminal, the target cell according to the target configuration information;
wherein the first configuration information of the relay terminal comprises third configuration information of the relay terminal on a Uu interface of the target cell and first sidelink interface configuration information of the relay terminal in the target cell;
wherein the second configuration information comprises bearer configuration information of the data of the remote terminal on a Uu interface of the relay terminal, and information about a mapping between a sidelink bearer or a QoS flow of the remote terminal and a Uu interface bearer.

2. The method according to claim 1, wherein
the accessing, by the relay terminal, the target cell according to the target configuration information comprises:
accessing, by the relay terminal, the target cell according to the third configuration information, and reconfiguring a sidelink interface according to the first sidelink interface configuration information.

3. The method according to claim 1, wherein after the receiving, by a relay terminal, a first message sent by a source cell, the method further comprises:
sending, by the relay terminal, second sidelink interface configuration information to the remote terminal by using a first sidelink radio resource control (RRC) message, wherein the second sidelink interface configuration information is sidelink interface configuration information of the remote terminal.

4. The method according to claim 1, wherein after the receiving, by a relay terminal, a first message sent by a source cell, the method further comprises:
sending, by the relay terminal, a notification to the remote terminal, wherein the notification instructs the relay terminal to hand over to the target cell.

5. The method according to claim 1, wherein the first message further carries an operation instruction of a packet data convergence protocol (PDCP) entity; and
after the receiving, by a relay terminal, a first message sent by a source cell, the method further comprises:
performing, by the relay terminal, a PDCP reconstruction process or a PDCP data recovery operation according to the operation instruction of the PDCP entity, wherein the PDCP reconstruction process comprises any one of the following: PDCP reconstruction corresponding to data of the relay terminal; or PDCP reconstruction corresponding to data of the relay terminal and PDCP reconstruction corresponding to data of the remote terminal; and
the PDCP data recovery operation comprises any one of the following: PDCP data recovery corresponding to the data of the relay terminal; or PDCP data recovery corresponding to the data of the relay terminal and PDCP data recovery corresponding to the data of the remote terminal.

6. The method according to claim 1, wherein before the accessing, by the relay terminal, the target cell according to the target configuration information, the method further comprises:
receiving, by the relay terminal, a handover execution message sent by the source cell.

7. The method according to claim 1, wherein after the accessing the target cell, the method further comprises:
sending, by the relay terminal, indication information to the remote terminal, wherein the indication information indicates that the relay terminal has accessed the target cell;
receiving, by the relay terminal, reconfiguration complete signaling sent by the remote terminal; and
sending, by the relay terminal, the reconfiguration complete signaling to the target cell.

8. The method according to claim 1, wherein the method further comprises:
receiving, by the relay terminal, reconfiguration complete signaling sent by the remote terminal, wherein the remote terminal is a remote terminal of the relay terminal; and
after accessing the target cell, sending, by the relay terminal, the reconfiguration complete signaling to the target cell.

9. The method according to claim 1, wherein before the receiving, by a relay terminal, a first message sent by a source cell, the method further comprises:
performing, by the relay terminal, measurement according to target measurement configuration information; and
reporting, by the relay terminal, measurement information to the source cell when a reporting condition is met.

10. A handover method, comprising:
sending, by a network device, a first message to a relay terminal, wherein the first message is used to instruct the relay terminal to hand over to a target cell, the first message carries target configuration information in the target cell, and the target configuration information comprises first configuration information of the relay terminal and second configuration information of data of a remote terminal on a Uu interface, wherein the remote terminal is a remote terminal of the relay terminal;
wherein the first configuration information of the relay terminal comprises third configuration information of the relay terminal on a Uu interface of the target cell and first sidelink interface configuration information of the relay terminal in the target cell;
wherein the second configuration information comprises bearer configuration information of the data of the remote terminal on a Uu interface of the relay terminal, and information about a mapping between a sidelink bearer or a QoS flow of the remote terminal and a Uu interface bearer.

11. The method according to claim 10, wherein the first message further carries an operation instruction of a packet data convergence protocol (PDCP) PDCP entity, and the operation instruction of the PDCP entity comprises a PDCP reconstruction instruction or a PDCP data recovery instruction,
- wherein the target configuration information further comprises sidelink interface configuration information of the remote terminal.

12. The method according to claim 10, wherein the method further comprises:
- sending, by the network device, a second message to the remote terminal, wherein the second message carries fourth configuration information of the remote terminal in the target cell.

13. The method according to claim 12, wherein after the sending, by the network device, a second message to the remote terminal, the method further comprises: sending, by the network device, a handover execution message to the relay terminal.

14. The method according to claim 12, wherein the sending, by a network device, a first message to a relay terminal comprises: sending, by the network device, the first message to the relay terminal after receiving acknowledgment feedback information of the relay terminal or the remote terminal for the second message.

15. The method according to claim 10, wherein before the sending, by a network device, a first message to a relay terminal, the method further comprises:
- sending, by the network device, a handover request message to a target base station in which the target cell is located, wherein the handover request message carries related information of the relay terminal, and the handover request message further indicates related information of the remote terminal; and
- receiving, by the network device, a handover request response message returned by the target base station, wherein the handover request response message carries the target configuration information.

16. A handover method, comprising:
- obtaining, by a remote terminal, fifth configuration information of the remote terminal in a target cell, the fifth configuration information comprising sidelink interface configuration information of the remote terminal in the target cell; and
- reconfiguring, by the remote terminal, a sidelink interface over a relay terminal according to the fifth configuration information;
- wherein obtaining, by the remote terminal, fifth configuration information of the remote terminal in the target cell comprises obtaining the fifth configuration information from the relay terminal after the relay terminal receives a first message sent by a source cell, wherein the first message is used to instruct the relay terminal to hand over to a target cell, the first message carries target configuration information in the target cell, and the target configuration information comprises first configuration information of the relay terminal and second configuration information of data of a remote terminal on a Uu interface, wherein the remote terminal is a remote terminal of the relay terminal;
- wherein the first configuration information of the relay terminal comprises third configuration information of the relay terminal on a Uu interface of the target cell and first sidelink interface configuration information of the relay terminal in the target cell;
- wherein the second configuration information comprises bearer configuration information of the data of the remote terminal on a Uu interface of the relay terminal, and information about a mapping between a sidelink bearer or a QoS flow of the remote terminal and a Uu interface bearer.

17. The method according to claim 16, wherein the obtaining, by a remote terminal, fifth configuration information of the remote terminal in a target cell comprises:
- receiving, by the remote terminal, a third message sent by the relay terminal over a sidelink, wherein the third message carries the fifth configuration information, and the fifth configuration information comprises sidelink interface configuration information of the remote terminal; or
- after receiving a notification message sent by the relay terminal, obtaining, by the remote terminal, the fifth configuration information by using a system information block (SIB) message or a preconfiguration message, wherein the notification message instructs the relay terminal to hand over to the target cell,
- wherein the third message further carries an operation instruction of a packet data convergence protocol (PDCP) PDCP entity, and the operation instruction of the PDCP entity comprises a PDCP reconstruction instruction or a PDCP data recovery instruction.

18. The method according to claim 16, wherein after the reconfiguring, by the remote terminal, a sidelink interface over a relay terminal according to the fifth configuration information, the method further comprises any one of the following:
- sending, by the remote terminal, reconfiguration complete signaling to the relay terminal;
- after receiving a notification message sent by the relay terminal, sending, by the remote terminal, the reconfiguration complete signaling to the target cell, wherein the notification message indicates that the relay terminal has accessed the target cell; and
- sending, by the remote terminal, the reconfiguration complete signaling to the target cell.

* * * * *